United States Patent
Gutman et al.

(10) Patent No.: US 7,273,550 B2
(45) Date of Patent: Sep. 25, 2007

(54) FILTER ASSEMBLIES WITH VALVES

(75) Inventors: Richard Guy Gutman, Chichester (GB); Roger Alexander Buttery, Petersfield (GB); Kenneth Roy Weight, Denmead (GB)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 11/393,785

(22) Filed: Mar. 31, 2006

(65) Prior Publication Data

US 2006/0169630 A1    Aug. 3, 2006

Related U.S. Application Data

(60) Division of application No. 10/694,404, filed on Oct. 28, 2003, now abandoned, which is a continuation of application No. 09/462,765, filed as application No. PCT/GB98/01975 on Jul. 6, 1998, now abandoned.

(51) Int. Cl.
*B01D 35/01* (2006.01)
(52) U.S. Cl. .............. 210/248; 210/418; 210/436; 210/448; 210/472; 251/343; 251/346; 251/351
(58) Field of Classification Search ........... 210/418, 210/419, 248, 436, 445, 446, 448, 450, 453, 210/493.2, 497.01, 313, 472; 422/26; 251/343, 251/346, 351
See application file for complete search history.

(56) References Cited

U.S. PATENT DOCUMENTS

| | | | |
|---|---|---|---|
| 1,264,718 A * | 4/1918 | Wagner | 251/351 |
| 1,579,567 A * | 4/1926 | Schriner | 251/351 |
| 3,696,932 A * | 10/1972 | Rosenberg | 210/437 |
| 3,701,433 A * | 10/1972 | Krakauer et al. | 210/436 |
| 3,893,478 A | 7/1975 | Peters | |
| 3,985,332 A | 10/1976 | Walker | |
| 4,126,559 A * | 11/1978 | Cooper | 210/445 |
| 4,225,440 A * | 9/1980 | Pitesky | 210/321.64 |
| 4,361,483 A * | 11/1982 | Pall | 210/445 |
| 4,557,834 A | 12/1985 | Mason | |
| 4,810,471 A * | 3/1989 | Wachob et al. | 422/103 |
| 4,826,055 A * | 5/1989 | Stull | 222/524 |
| 5,285,999 A | 2/1994 | Scholz | |
| 5,435,339 A | 7/1995 | Hayes | |

FOREIGN PATENT DOCUMENTS

| | | |
|---|---|---|
| GB | 943132 | 11/1963 |
| GB | 1 381 391 | 1/1975 |
| GB | 1 418 046 | 12/1975 |
| GB | 1 463 303 | 2/1977 |
| GB | 1 479 226 | 7/1977 |
| GB | 1 511 240 | 5/1978 |
| GB | 1 542 668 | 3/1979 |
| GB | 2 233 574 | 1/1991 |
| WO | WO 94/19086 | 9/1994 |

* cited by examiner

*Primary Examiner*—Matthew O. Savage
(74) *Attorney, Agent, or Firm*—Leydig, Volt & Mayer, Ltd.

(57) ABSTRACT

A filter assembly may include a valve which includes a valve member. The valve member moves between a first position and a second position and the valve is opened and closed.

29 Claims, 3 Drawing Sheets

FILTER ASSEMBLIES WITH VALVES

Figure 1:
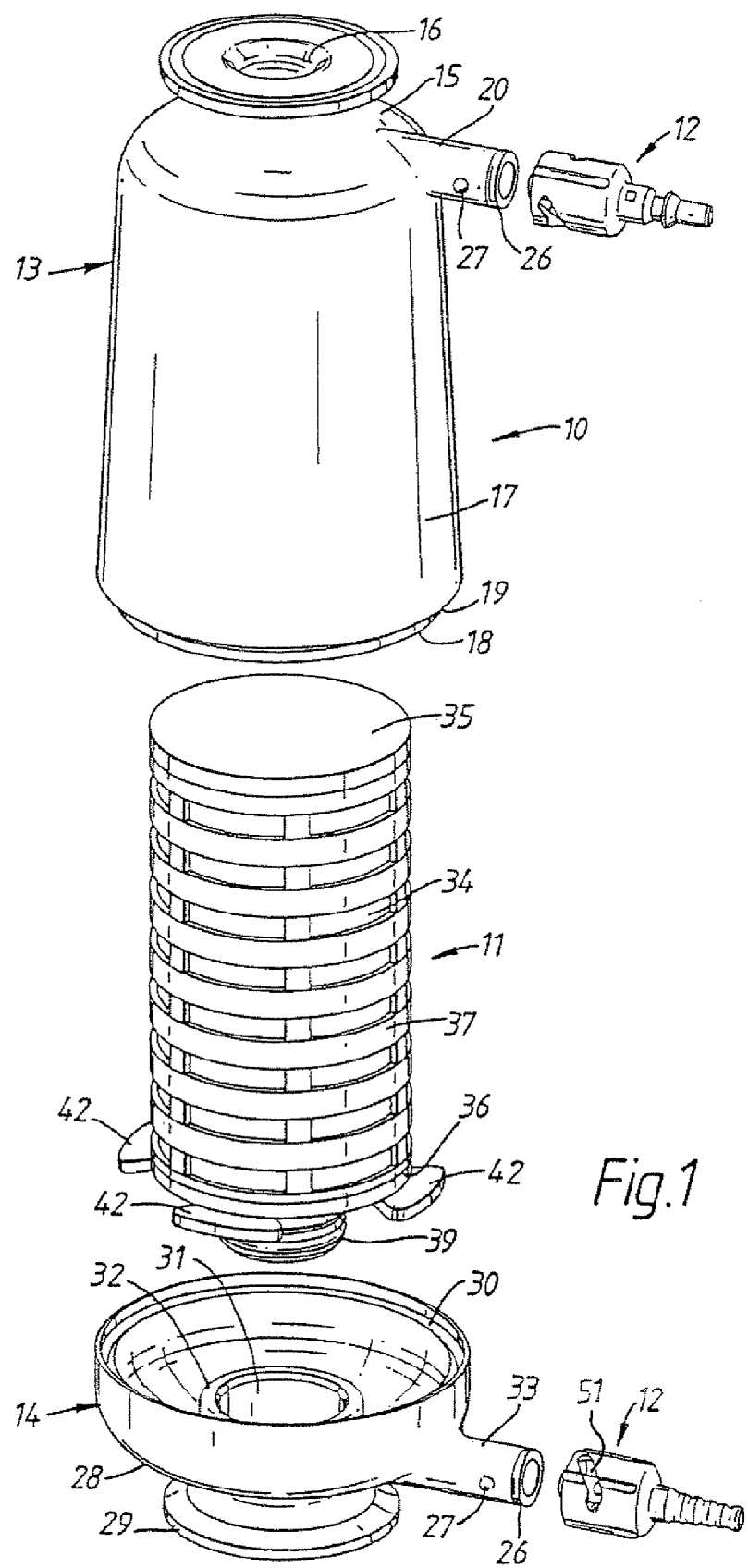

This application is a divisional of U.S. application Ser. No. 10/694,404, which was filed on Oct. 28, 2003, which is now abandoned, and is a continuation of U.S. application Ser. No. 09/462,765, which was filed on Jun. 2, 2000, which is now abandoned and was the United States national phase of International Application No. PCT/GB98/01975, which was filed on Jul. 6, 1998, all of which are incorporated by reference.

The invention relates to filter assemblies and valves.

A known form of filter assembly comprises a housing providing an inlet port and an outlet port with a filter element being held in the housing and comprising a filter medium having a central passage extending between first and second ends of the filter medium. The first end of the filter medium is connected to an end cap to close the passage and the second end of the filter medium is in fluid communication with a port of the housing.

In this way, fluid passing to the housing flows through the filter medium in a path including the inlet port, the outlet port and the passage. Such filters are used extensively for medical, biomedical and pharmaceutical purposes.

It is a requirement of such filter assemblies that the filter element must be capable of being integrity tested. For water-wettable filter media integrity can be tested by the Water Bubble Point Test or the Diffusive Forward Flow Test. In the Water Bubble Point Test, the filter element is placed in a water bath with both the first and second ends of the passage closed and air is pumped into the passage at a pressure which is increased until the first bubble is observed on the exterior of the filter medium. If the structure of the filter medium has integrity over its whole volume, this first bubble will appear at a predetermined pressure. If a bubble or bubbles appear at a lower pressure, it is an indication that the structure of the filter medium is not uniform over the whole volume of the filter medium. This can indicate the incidence of passages through the filter medium which might allow the passage through the medium in use of unfiltered or only partly filtered fluid.

In the Diffusive Forward Flow Test, the filter medium is wetted with water and surplus water is removed. Air is applied to one side of the medium at a specified pressure and the diffusive air flow rate is measured. This diffusive air flow rate has been found to be related to the removal rating of the medium. A greater than expected flow rate can indicate lack of integrity of the medium.

However, the connection to a water-wettable filter medium of an end cap can change the characteristics of the medium so that integrity testing is no longer possible. For example, the connection can produce hydrophobic zones in the medium which do not wet out in the integrity test and thus plainly affect the performance of the medium in the integrity test.

For this reason, the materials of the filter medium and the end cap are usually chosen so that connection of the medium and the end cap does not affect the characteristics of the medium in a manner that would affect the medium's performance in an integrity test.

The material of the end cap is also important for hydrophobic filter media. Some hydrophobic filter media are easily damaged by heat. These media are attached to the end cap by heating the end cap to soften the end cap and inserting the first end of the medium into the end cap while the end cap is softened. It is therefore important to choose a material for the end cap that softens at a relatively low temperature such that the connection can be carried out without damaging the media.

However, it is also a requirement for such filter assemblies that have medical, biomedical and pharmaceutical uses that they can be sterilized to allow for repeated use. There are two principal forms of sterilization; in situ steam sterilization and steam autoclaving. In situ steam sterilization, instead of fluid to be filtered passing to the filter assembly, high pressure and high temperature steam are passed through the filter assembly. For example, the steam pressure may be several bars and the temperature 140° C. In steam autoclaving, the filter assembly is removed from associated equipment and transferred to an autoclave where it is steam sterilized. The filter assembly is then removed from the autoclave, transferred aseptically and replaced in the equipment. A typical filter assembly might need sterilizing 100 times in its lifetime.

Where the housing of such a filter assembly is made of a plastics material, the second end of the filter medium is usually connected to the housing by heating the housing material and inserting the second end of the filter medium into the housing material. For water-wettable media, in order to produce a water wettable joint for integrity testing purposes, it is thus necessary to have the housing of an appropriate material that produces the required join. For hydrophobic media that are relatively easily damaged by heat it is necessary for the plastics material of the housing to have a relatively low softening temperature. Such plastics materials are not able to withstand the pressures and temperatures of in situ steam sterilization. Accordingly, such filter assemblies must be sterilized by autoclaving. This requires the filter assembly to be removed from service, autoclaved and then transferred aseptically back into service.

The known alternative is to house the filter element in a metal housing. The metal will withstand the temperatures and pressures of in situ steam sterilization but metal housings are typically much bulkier than plastics housings and are more expensive to produce and require cleaning before re-use.

It is also a problem with filter assemblies in providing valves for the inlet port and the outlet port. Such valves need to be capable of steam sterilization, and many are not.

According to a first aspect of the invention, filter assemblies may comprise a plastics housing, a filter element, a passage, a valve, and first and second O-ring seals. The housing has an interior, an exterior, an inlet, and an outlet, The filter element is in the interior of the housing and includes a filter medium. The passage extends between the interior and the exterior of the housing and is separate from the inlet and the outlet. The valve includes a valve member and a rotatable sleeve connected to the valve member. The valve member is located within The passage and is movable between a first position and a second position. In the first position, fluid flow along the passage is permitted. In The second position, the valve member seals The passage and fluid flow along the passage is prevented. The valve member moves axially between the first and second positions in response to rotation of the sleeve. The valve further includes a pin and a slot which receives the pin. The engagement of the pin in the slot causes the valve member to move axially between the first and second positions in response to rotation of the sleeve. The housing further includes an outwardly extending port having an open end, and the sleeve surrounds the exterior of the housing port. The pin and the slot are arranged with the sleeve and the exterior of the housing port to move the sleeve axially along the exterior of The port in response to rotation of the sleeve. The passage extends through the housing port to the open end, and the housing port defines first and second portions of the passage. The valve member has a blind end and extends into the passage from the open end in the housing port. The first O-ring seal seals the valve to the housing port in the first position, and the second O-ring seal seals the blind end of the valve member to the housing port in the second position.

According to another aspect of the invention, filter assemblies may comprise a plastics housing, a filter element, a passage, a valve, and first and second O-ring seals. The housing has an interior, an exterior, an inlet, and an outlet. The filter element is in the interior of the housing and includes a filter medium. The passage extends between the interior and the exterior of the housing, is separate from the inlet and the outlet, and includes first and second portions. The valve includes a valve member, a rotatable sleeve connected to the valve member, a slot, and a pin disposed in the slot. The valve member is located within the passage and is movable between a first position and a second position. In the first position, fluid flow along the passage is permitted. In the second position, the valve member seals the second portion of the passage and fluid flow along the passage is prevented. The valve member moves axially between the first and second positions in response to rotation of the sleeve. The passage further includes a third portion which extends through the valve member. In the first position of the valve member, the first portion of the passage fluidly communicates with the third portion of the passage. The housing further includes an outwardly extending port having an open end, and the sleeve surrounds the exterior of the housing port. The pin and the slot are arranged with the sleeve and the exterior of the housing port to move the sleeve axially along the exterior of the port and to move the valve member axially between the first and second positions in response to rotation of the sleeve. The passage extends through the housing port to the open end, and the housing port defines the first and second portions of the passage. The valve member has a blind end and extends into the passage from the open end in the housing port. The first O-ring seal seals the valve to the housing port in the first position, and the second O-ring seal seals the blind end of the valve member to the housing port in the second position.

According to another aspect of the invention, filter assemblies may comprise a plastics housing, a filter element, a passage, a valve. The housing has an interior, an exterior, an inlet and an outlet. The filter element is in the interior of the housing and includes a filter medium. The passage extends between the interior and the exterior of the housing, and the passage includes first and second portions. The first portion of the passage includes a plurality of spaced ribs. The valve includes a valve member and a rotatable sleeve. The valve member is located within the passage and is movable between a first position and a second position. In the first position, fluid flow along the passage is permitted. In the second position, the valve member seals the second portion of the passage and fluid flow along the passage is prevented. The valve member moves axially between the first and second positions in response to rotation of the sleeve.

According to another aspect of the invention, filter assemblies may comprise a plastics housing, a filter element, a passage, a valve, and first and second O-ring seals. The housing has an interior, an exterior, an inlet, and an outlet. The filter element is in the interior of the housing and includes a filter medium. The passage extends between the interior and the exterior of the housing is separate from the inlet and the outlet, and has a first portion and a second portion. The valve includes a rotatable sleeve, a pin, a slot, and a valve member. The valve member moves between a first position and a second position. In the first position, the valve member is in the first portion of the passage and the valve is open. In the second position, the valve member is sealed within the second portion of the passage and the valve is closed. The valve member moves axially in the passage in response to rotation of the sleeve and engagement of the pin in the slot. The housing further includes an outwardly extending port having an open end, and the sleeve surrounds the exterior of the housing port. The pin and the slot are arranged with the sleeve and the exterior of the housing port to move the sleeve axially along the exterior of the port in response to rotation of the sleeve. The passage extends through the housing port to the open end, and the housing port defines the first and second portions of the passage. The valve member is connected to the sleeve, has a blind end, and extends into the passage from the open end of the housing port. The first O-ring seal seals the valve to the housing port in the first position, and the second O-ring seal seals the blind end of the valve member to the housing port in the second position.

Figure 2:
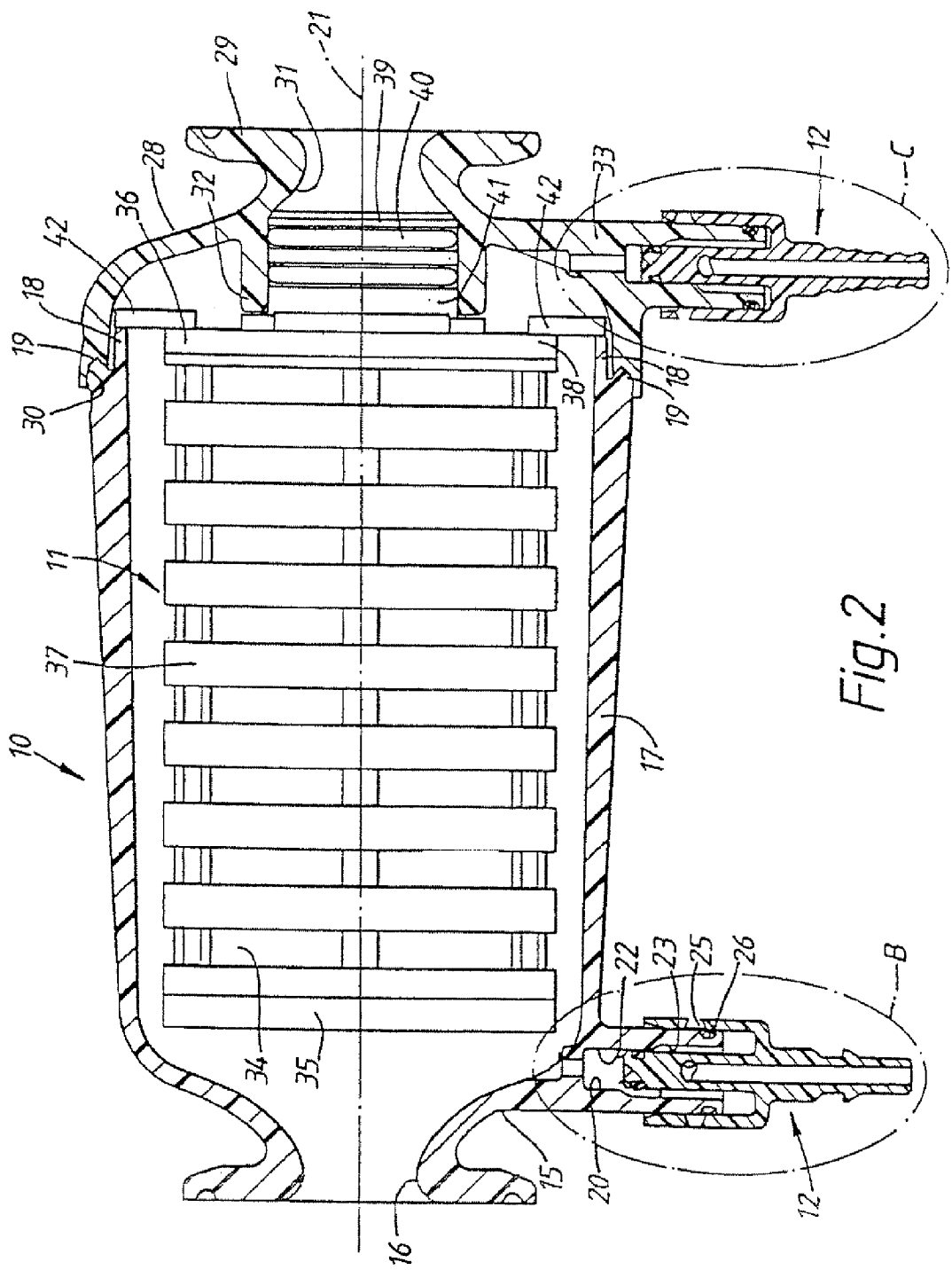
Figure 3:
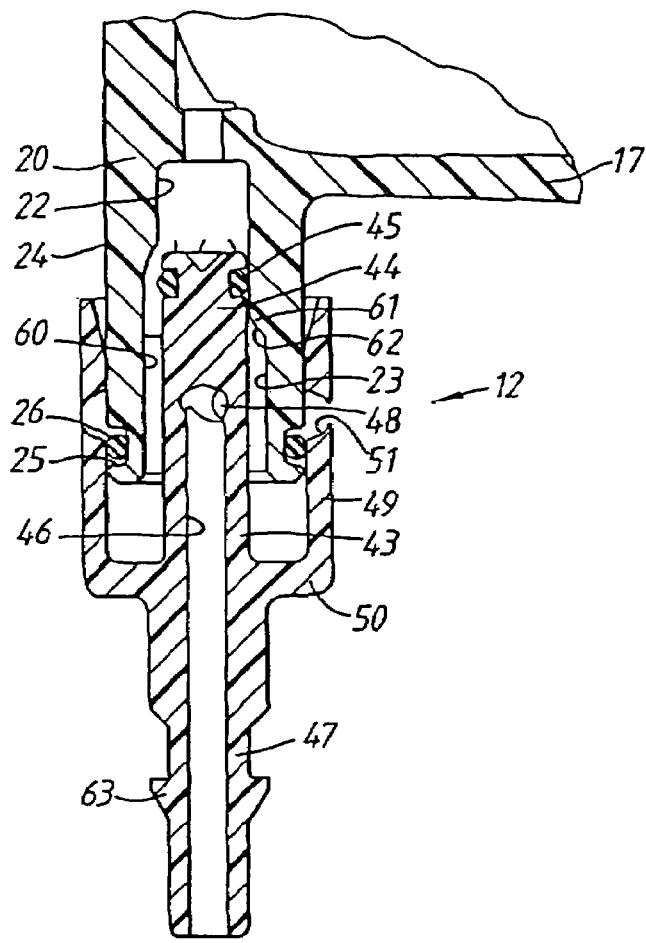
Figure 4:
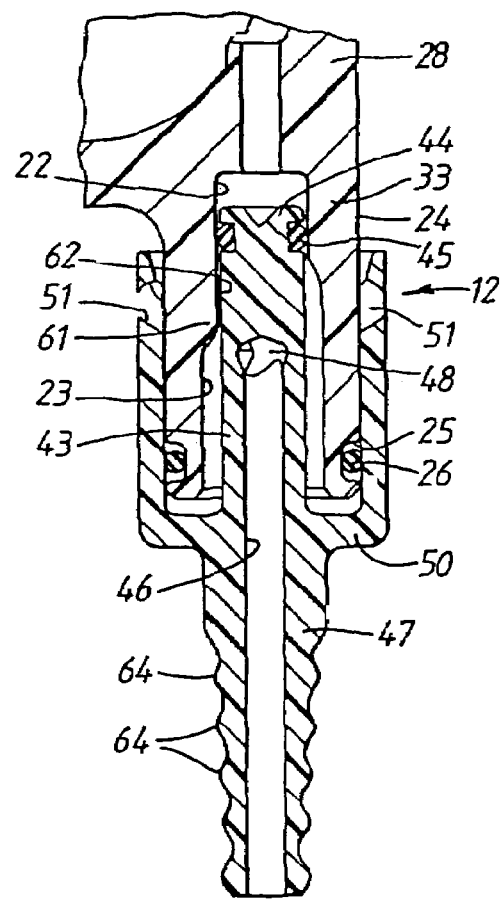

The following is a more detailed description of an embodiment of the invention, by way of example, reference being made to the accompanying drawings in which:

FIG. 1 is an exploded view of a filter assembly showing first and second parts of a filter housing, a filter element within the housing and valves connected to inlet and drainage ports of the housing, FIG. 2 is a cross-section on the axis of the housing of FIG. 1, showing one valve in an open position and a second valve in a closed position, FIG. 3 is detail B of FIG. 2 showing the open valve to a larger scale, and FIG. 4 is detail C of FIG. 2 showing the closed valve to a larger scale.

Referring to the drawings, and particularly FIG. 1, the filter assembly comprises a housing indicated generally at 10, a filter element 11 encapsulated in the housing 10 and two valves 12 carried by the housing 10.

The housing 10 comprises a first housing part 13 and a second housing part 14. Both parts are made, for example moulded, from a polysulphone material. The first housing part 13 includes an end wall 15 provided with an inlet port 16 for the medium to be filtered, and a circular cross-section side wall 17 extending downwardly from the end wall 15 and terminating at a circular edge 18. An outwardly facing annular rebate 19 is formed in the side wall 17 adjacent the edge.

An air vent port 20 is formed at the junction between the end wall 15 and the side wall 17 and extends in a direction generally radially relative to the axis 21 (see FIG. 2) of the housing 10. The inner surface 60 of the air vent port 20 defines a passage having a smaller diameter portion 22 closer to the side wall 17 and a larger diameter portion 23 further from the side wall 17 and terminating at the end of the air vent port 20. Five ribs 61 extend into the larger diameter portion 23 from the inner surface 60. The ribs 61 are spaced equi-angularly around the surface 60. Each rib 61 has an edge 62 that is continuous and in line with the inner surface 60 at the small diameter portion of the passage.

The air vent port 20 has an exterior surface 24 provided with an annular groove 25 adjacent the end of the port 20 which carries an O-ring seal 26. In addition, this surface 24 has two pins 27 projecting radially from the surface at respective positions on the surface spaced from the end of the port 20. The function of the seal 26 and the pins 27 is described below.

The second housing part 14 includes a second end wall 28 provided with a disc-shaped stand 29. The second end wall 28 has its end remote from the stand of generally annular shape coaxial with the axis 21 of the housing 10. This portion of the second end wall 28 is provided with an inwardly facing rebate 30.

As best seen in FIG. 2, the second end wall 28 has an outlet port 31 in the form of a generally circular cross-section passage co-axial with the axis 21 of the housing 10 and extending through the second end wall 28 and the stand 29. The end of the outlet port 31 within the housing 10 forms an annular flange 32.

A drainage port 33 is provided in the second end wall 28 and extends radially from the second end wall 28 relative to the axis 21 of the housing 10. The drainage port 33 is constructed similarly to the air vent port 20 (parts common to the two ports 20, 33 are given the same reference numerals and will not be described in detail).

The filter element 11 comprises a filter medium 34, a first end cap 35, a second end cap 36 and a cage 37. The filter medium may be of any convenient material and any convenient shape that provides a central passage for the flow of fluid to be filtered. For example, the filter medium 34 may be annular. The material may be pleated or unpleated. Examples of suitable filter media are those sold by Pall Corporation under the trademarks ULTIPOR, FLUORO-DYNE, SUPOR and EMFLON.

The filter medium 34 has a first end and a second end with a passage extending between the ends. The first end cap 35 is disc-shaped and is formed from a plastics material. The first end cap 35 is preferably connected to the first end of the filter medium 34 by heating the end cap 35 to soften the end cap 35 and then inserting the filter medium into the softened end cap material to form a joint.

The material of the first end cap 35 is chosen so that, when the filter medium 34 is connected to the first end cap 35, the characteristics of the medium 34 are not materially changed. In particular, when the filter medium 34 is of a water-wettable material, the material of the first end cap is chosen to that a water wettable joint is formed between the filter medium 34 and the first end cap 35. In this case, the end cap material will depend on the material of the filter medium 34. For example, when the filter medium 34 is a FLUORO-DYNE or SUPOR medium, the end cap 35 may be composed of polypropylene. When the filter medium 34 is composed of a nylon material the first end cap 35 may be composed of a polyester or nylon material.

It is important to obtain a water-wettable joint between water-wettable filter media and the first end cap 35 in order to allow the filter element to be integrity tested. An integrity test involves the filter element being placed in a bath of water (with the ends of the passage closed) and air is then supplied to the passage at increasing pressure. The bath is then observed to determine at what pressure the first bubble appears on the exterior of the filter medium. If the porous structure of the filter medium is integral over the whole area of the filter medium, then the first bubble will appear at a relatively high pressure. If, however, the porous structure is not integral over the whole area of the filter medium 34, then the first bubble will appear at a relatively lower pressure. If the junction between the first end cap 35 and the filter medium 34 is not water-wettable, it creates a hydrophobic zone through which air passes readily since the porous structure is not wetted out by water. Although this does not normally affect filtration during use of the assembly, it is not possible to test the integrity as described above. The formation of hydrophobic zones similarly prevents the medium being tested by the Diffusive Forward Flow Test described above.

Where the filter medium 34 is hydrophobic, it is important to ensure that the first end cap 35 is composed of a material that can be softened at a temperature that is sufficiently low so that the integrity of the medium 35 is not damaged by the insertion process. For example, when the filter medium 34 is composed of PVDF (such as an EMFLON 2 medium) the first end cap 35 may be composed of polypropylene. Where the filter medium 35 is composed of PTFE, which is relatively resistant to heat, it is also preferable to use polypropylene end caps.

The second end cap 36 comprises a flat annular portion 38 with a central aperture. A projecting tube 39 surrounds the aperture and extends away from the filter medium 34 in a direction normal to the plane of the flat annular portion 38. The tube 39 is provided with two annular seals 40 on its exterior surface 41. Four flanges 42 project radially outwardly of the flat annular portion 38 and are equi-angularly spaced around this portion 38.

The outer diameter of the tube 39 is generally equal to the interior diameter of the outlet port 31.

For any filter medium 34, the material of the second end cap is chosen based on the same considerations affecting the choice of the material of the first end cap. The material of the second end cap 36 will normally, but not necessarily, be the same as the material of the first end cap 35. The filter medium 34 is connected to the second end cap 36 by heating the second end cap 36 and then inserting the filter medium 34 into the softened material. The cage 37, which is of known type, surrounds the exterior surface of the filter medium 34 between the first and second end caps 35, 36.

The filter element 11 is mounted in the housing in the following way. First, the tube 39 on the second end cap 36 is inserted into the outlet port 31 in the second end wall 28. The seals 40 prevent leakage between these parts. When fully inserted, the flange 32 of the outlet port 31 bears against the under-surface of the flat annular portion 38 of the second end cap 36. This holds the filter element 11 in the second end wall 28 coaxial with the housing axis 21. In addition, it connects the interior passage of the filter medium 34 with the outlet port 31 via the tube 39.

The first housing part 13 is then placed over the filter element 11 with the edge 18 fitting within the second end wall 28 and the rebate 19 adjacent this edge mating with the rebate 30 in the second end wall 28. The first and second housing parts 13, 14 are then welded together around the rebates 19, 30.

When so positioned, the edge 18 of the side wall 17 bears against the flanges 42. The effect of this is to clamp the filter element 11 between this edge 18 and the end of the flange 32 surrounding the outlet port 31 and contacting the second end cap 36. In this way, the filter element 11 is held firmly in position encapsulated in the housing 10.

Referring next to FIGS. 3 and 4 in particular, the valves 12 control flow through the air vent port 20 and the drainage port 33. The valves 12 are identical and so only one of them will be described.

The valve 12 comprises an elongated valve member 43 which is generally circular in cross-section. The valve member 43 has a blind end 44 within the associated port. The blind end 44 carries an O-ring 45 in a groove provided on an exterior surface. The remainder of the valve member 43 has an axial passage 46 leading to a connector 47 for connection to a hose or pipe. In FIG. 3 the connector 47 has an annular triangular-section rib 63 and in FIG. 4 the connector 47 has a succession of axially spaced ribs 64. At least one radial passage 48 connects the end of the axial passage 46 adjacent the blind end 44 with the exterior surface of the valve member 43.

A sleeve 49 is arranged coaxially with the axis of the valve member 43 and is spaced from the valve member 43 by an annular radially extending flange 50. The sleeve 49 is a sliding fit over the exterior surface 24 of the associated port 20, 31. In addition, the sleeve is provided with two helical slots 51 (seen best in FIG. 1) extending around a portion of the sleeve 49. Each pin 27 is received in a respective one of the slots 51.

The sleeve 49 can thus be rotated relative to the associated port 20, 33 with such rotation being controlled by the engagement of the pin 27 in the slot 51 to cause the sleeve 49 also to move axially relative to the associated port 20, 33. This rotation can take place in both senses.

The effect of this rotation is best seen in FIGS. 3 and 4. At one limit of rotation in one sense, as seen in FIG. 3, the blind end 44 of the valve member 43 lies in the larger diameter portion 23 of the associated port 20, 33. When so positioned, the valve member 43, and the associated O-ring 45, do not obstruct the port and so allow flow into the port, through the radial passage 48 and along the axial passage 46. Reverse flow is, of course, also possible. Leakage around the sleeve 49 is prevented by the O-ring seal 26 on the exterior surface 24 of the port 20, 33. The O-ring 45 is kept pressed into the groove on the outer surface of the blind end by the ribs 61—the edges 62 bearing against the O-ring 45.

Rotation of the sleeve 49 in the opposite sense moves the blind end 44 into the smaller diameter portion. The O-ring 45 is guided into the smaller diameter portion by the edges 62. Maximum rotation in the opposite sense disposes the valve member as shown in FIG. 4. In this disposition, the blind end 44 lies within the smaller diameter portion 22 of the associated port 20, 33. The O-ring 45 seals against the inner surface 60 of the port 20, 33 so preventing flow through the valve. It will be appreciated that because the seal is made against the circumference of the smaller portion 22 (and not, for example, against a radially extending seat) the port 20, 33 and the valve member 43 can undergo differential expansion during heating without causing damage to the valve as the blind end 44 simply moves axially with the small portion 22.

Thus, by twisting the sleeve 49 is one sense or the other, the associated port 20, 33 can be opening or closed. It will also be appreciated that the pin 27 and slot 51 mechanism prevents the valve 12 being disengaged completely from the associated port 20, 33.

The valves 12 are preferably made from a polysulphone material.

The housing parts 13, 14 and the valves 12 may also be made from any other suitable plastics material capable of withstanding in-line sterilization. As stated above, in-line sterilization involves passing steam under pressure through the housing. The exterior of the housing is kept at atmospheric pressure and so there is a pressure differential across the housing. The minimum temperature and pressure of steam commonly used for sterilization is generally about 121° C. at about 1 bar above atmospheric pressure, although in some circumstances, in particular if exposure to the steam is prolonged, sterilization may be achievable at lower temperatures and pressures. However, it is often desirable to sterilize the assembly in-line under harsher conditions, for example using steam at about 142° C. and about 2.83 bar above atmospheric pressure. The housing is preferably resistant to such harsher conditions. Examples of plastics other than polysulphone that are suitable are PEEK, PEK, polyphenyleneoxide, polyphenylenesulphide, polyethersulphone polyalkoxysulphone and polyarylsulphone.

In use, the filter assembly described above with reference to the drawings is mounted in a line containing a fluid to be filtered. This may be, for example, a medical, biomedical or pharmaceutical fluid. A tube leading from a source of fluid to be filtered is connected to the inlet 16. The outlet port 31 is connected to a receiver of filtered fluid. The drainage port 33 is connected to a tube leading to a receiver for drained fluid. The valve 12 of the air vent port 20 is opened and the valve 12 of the drainage port 33 is closed. Fluid to be filtered is then fed through the inlet 16 to fill the housing 10. The air vent port 20 is then shut. The fluid passes through the filter medium 34 where it is filtered and the filtered fluid enters the passage before passing through the tube 39 and the outlet port 31.

When the filter assembly is to be sterilized, the inlet 16 is disconnected from the supply of fluid to be filtered and the outlet port 31 is disconnected from the receiver of filtered fluid. The drainage port valve 12 is open to drain excess fluid from the housing 10. The inlet 16 is then connected to a supply of steam under pressure and the outlet port 31 is connected to a drain. The valves 12 are left slightly open. Steam at the pressure of several bars and a temperature of about 140° C. is then fed through the housing to steam sterilize the filter material 34 and the other components. The housing 10, since it is made of polysulphone (or another suitable plastics material), is able to withstand the temperature and pressure of the steam. The same is true of the valves 12; because they are made of polysulphone (or another suitable plastics material), they will withstand the in-line steam sterilization without damage.

Once steam sterilization is complete, water can be drained by fully opening the drainage port valve 12 and the filter assembly reconnected for filtering fluid.

By separating the caps 35, 35 from the housing 10, these parts can be made in different materials to provide the water wettability necessary for the filter medium 34 and the resistance to in-line steam sterilization necessary for the housing 10.

It will be appreciated that there are a number of modifications that can be made to the arrangement described above.

The valves 12 need not be as described above. Any suitable valves could be used. The plastics material of the housing 10 need not be polysulphone, it could be any material that is capable of withstanding in-line steam sterilization. The filter element 11 need not be clamped in the housing 10 as described, it could be held in any suitable way. The cage 37 need not be as described, any suitable cage could be provided. The filter medium 34 may be provided with upstream and/or downstream drainage layers.

The invention claimed is:

1. A filter assembly comprising:
   a plastics housing having an interior, an exterior, an inlet, and an outlet;
   a filter element in the interior of the housing and including a filter medium;
   a passage extending between the interior and the exterior of the housing, the passage being separate from the inlet and the outlet;
   a valve including a valve member and a rotatable sleeve, wherein the valve member is located within the passage and is movable between a first position in which fluid flow along the passage is permitted and a second position in which the valve member seals the passage and fluid flow along the passage is prevented, wherein the valve member moves axially between the first and second positions in response to rotation of the sleeve, and wherein the valve further includes a pin and a slot which receives the pin, the engagement of the pin in the slot causing the valve member to move axially between the first and second positions in response to rotation of the sleeve;

wherein the housing further includes an outwardly extending port having an open end and the passage extends through the housing port to the open end, the housing port defining first and second portions of the passage, wherein the valve member and the sleeve are connected, the valve member having a blind end and extending into the passage from the open end of the housing port, and the sleeve surrounds an exterior of the housing port, and wherein the pin and the slot are arranged with the sleeve and the exterior of the housing port to move the sleeve axially along the exterior of the housing port in response to rotation of the sleeve; and first and second O-ring seals, wherein the first O-ring seal seals the valve to the housing port in the first position and the second O-ring seal seals the blind end of the valve member to the housing port in the second position.

2. The filter assembly of claim 1 wherein the slot is in the sleeve.

3. The filter assembly of claim 1 wherein the blind end of the valve member and the second O-ring seal seal the second portion of the passage in the second position.

4. The filter assembly of claim 3 wherein the second portion of the passage has a smaller diameter than the first portion.

5. The filter assembly of claim 1 wherein the passage includes a third portion which extends through the valve member and wherein the third portion and the first portion of the passage fluidly communicate in the first position of the valve member.

6. The filter assembly of claim 1 wherein the first portion of the passage includes a plurality of ribs.

7. The filter assembly of claim 1 wherein the first O-ring seal is located between the interior of the sleeve and the exterior of the housing port.

8. The filter assembly of claim 1 wherein the second O-ring seal is located between the exterior of the valve member and the interior of the housing port.

9. A filter assembly comprising:
a plastics housing having an interior, an exterior, an inlet, and an outlet;
a filter element in the interior of the housing and including a filter medium;
a passage extending between the interior and the exterior of the housing, wherein the passage is separate from the inlet and the outlet and includes first and second portions;
a valve including a valve member, a rotatable sleeve, a pin, and a slot, wherein the valve member is located within the passage and is movable between a first position in which fluid flow along the passage is permitted and a second position in which the valve member seals the second portion of the passage and fluid flow along the passage is prevented, wherein the valve member moves axially between the first and second positions in response to rotation of the sleeve, and wherein the passage includes a third portion which extends through the valve member, the first portion and the third portion of the passage fluidly communicating in the first position;

wherein the housing further includes an outwardly extending port having an open end and the passage extends through the housing port to the open end, the housing port defining the first and second portions of the passage, wherein the valve member and the sleeve are connected, the valve member having a blind end and extending into the passage from the open end of the housing port, and the sleeve surrounds an exterior of the housing port, and wherein the pin is disposed in the slot and the pin and the slot are arranged with the sleeve and the exterior of the housing port to move the sleeve axially along the exterior of the port and to move the valve member axially between the first and second positions in response to rotation of the sleeve; and first and second O-ring seals, wherein the first O-ring seal seals the valve to the housing port in the first position and the second O-ring seal seals the blind end of the valve member to the housing port in the second position.

10. The filter assembly of claim 9 wherein the first portion of the passage includes a plurality of ribs.

11. The filter assembly of claim 9 wherein the first O-ring seal is located between the interior of the sleeve and the exterior of the housing port.

12. The filter assembly of claim 9 wherein the second O-ring seal is located between the exterior of the valve member and the interior of the housing port.

13. The filter assembly of claim 9 wherein the slot is in the sleeve.

14. The filter assembly of claim 9 wherein the blind end of the valve member and the second O-ring seal seal the second portion of the passage in the second position.

15. The filter assembly of claim 14 wherein the second portion of the passage has a smaller diameter than the first portion.

16. A filter assembly comprising:
a plastics housing having an interior, an exterior, an inlet, and an outlet;
a filter element in the interior of the housing and including a filter medium;
a passage extending between the interior and the exterior of the housing, wherein the passage includes first and second portions and wherein the first portion of the passage includes a plurality of spaced ribs;
a valve including a valve member and a rotatable sleeve, wherein the valve member is located within the passage and is movable between a first position in which fluid flow along the passage is permitted and a second position in which the valve member seals The second portion of the passage and fluid flow along the passage is prevented, and wherein the valve member moves axially between the first and second positions in response to rotation of the sleeve.

17. The filter assembly of claim 16 wherein the valve member is connected to the sleeve and the sleeve moves axially with the valve member.

18. A filter assembly comprising:
a plastics housing having an interior, an exterior, an inlet and an outlet;
a filter element in the interior of the housing and including a filter medium;

a passage which extends between the interior and the exterior of the housing, is separate from the inlet and the outlet, and has a first portion and a second portion; and a valve including a rotatable sleeve, a pin, a slot and a valve member, wherein the valve member moves between a first position in which the valve member is in the first portion of the passage and the valve is open and a second position in which the valve member is sealed within the second portion of the passage and the valve is closed, and wherein the valve member moves axially in the passage in response to rotation of the sleeve and engagement of the pin in the slot;

wherein the housing further includes an outwardly extending port having an open end and the passage extends though the housing port to the open end, the housing port defining the first and second portions of the passage, wherein the valve member and the sleeve are connected, the valve member having a blind end and extending into the passage from the open end in the housing port, and the sleeve surrounds an exterior of the housing port, and wherein the pin and the slot are arranged with the sleeve and the exterior of the housing port to move the sleeve axially along the exterior of the housing port in response to rotation of the sleeve; and first and second O-ring seals, wherein the first O-ring seal seals the valve to the port in the first position and the second O-ring seal seals the blind end of the valve member to the housing port in the second position.

19. The filter assembly of claim 18 wherein the slot is in the sleeve.

20. The filter assembly of claim 18 wherein the passage includes a third portion which extends through the valve member and wherein the third portion and the first portion of the passage fluidly communicate in the first position of the valve member.

21. The filter assembly of claim 18 wherein the blind end of the valve member and the second O-ring seal seal the second portion of the passage in the second position.

22. The filter assembly of claim 21 wherein the second portion of the passage has a smaller diameter than the first portion.

23. The filter assembly of claim 18 wherein the first portion of the passage includes a plurality of ribs.

24. The filter assembly of claim 18 wherein the first O-ring seal is located between the interior of the sleeve and the exterior of the housing port.

25. The filter assembly of claim 18 wherein the second O-ring seal is located between the exterior of the valve member and the interior of the housing port.

26. A filter assembly comprising a plastics housing having an interior, an exterior, an inlet, and an outlet;

a filter element in the interior of the housing and including a filter medium;

a passage extending between the interior and the exterior of the housing and including a first portion and second portion;

a valve including a valve member and a rotatable sleeve, wherein the valve member is located within the passage and is axially movable between a first position in which the valve member is in the first portion of the passage and the valve is open and a second position in which the valve member is in the second portion of the passage and the valve is closed, wherein the valve member includes a seal which seals against the second portion of the passage in the second position, wherein the first portion of the passage includes a plurality of ribs which guide the seal into the second portion of the passage as the valve member moves to the second position, and wherein the valve member moves axially between the first and second positions in response to rotation of the sleeve.

27. The filter assembly of claim 26 wherein the valve member has a blind end.

28. The filter assembly of claim 26 wherein the seal comprises an O-ring.

29. The filter assembly of claim 26 wherein the first portion of the passage has a larger diameter than the second portion of the passage.

* * * * *